United States Patent [19]
Dockendorf et al.

[11] 3,922,350
[45] Nov. 25, 1975

[54] PROCESS FOR PREPARING ACIDIFIED BREAD DOUGH

[75] Inventors: William G. Dockendorf, Stamford; Harold Gross, Norwalk, both of Conn.

[73] Assignee: Standard Brands Incorporated, New York, N.Y.

[22] Filed: Apr. 19, 1974

[21] Appl. No.: 462,473

[52] U.S. Cl. .................. 426/25; 426/62; 426/96; 426/99
[51] Int. Cl.² .................. A21D 2/14; A21D 10/00
[58] Field of Search .................. 426/25, 62, 96, 99

[56] References Cited
UNITED STATES PATENTS
3,734,748   5/1973   Veno et al. .................. 426/25 X

*Primary Examiner*—James R. Hoffman

[57] ABSTRACT

Acidified bread dough suitable for preparing sour dough bread may be prepared by incorporating into a dough containing baker's yeast an effective amount of fumaric acid coated with an edible material. The coating has a melting point temperature higher than normal proofing temperatures but within the range of normal baking temperatures.

9 Claims, No Drawings

PROCESS FOR PREPARING ACIDIFIED BREAD DOUGH

THE INVENTION

This invention relates to a process for preparing yeast leavened bread dough having an acidity higher than conventional bread dough and suitable for preparing sour dough bread. More particularly, this invention relates to a process for producing acidified bread dough in which a coated acidulent is provided which does not substantially adversely affect the leavening activity of the yeast.

Breads having a distinctive sour or acid taste have been produced for many years by the so-called "sourdough" method. Basic to this method is the addition to a freshly prepared dough mixture of a minor proportion of a starter comprising a mixture of flour and water which has been allowed to develop or ripen over a period of hours or days. Frequently, in commercial bakery practice a portion of a batch of prepared sour dough is set aside and used as a starter for the next day's production of sour dough.

The function of the starter is to provide leavening, acidification and flavor to the sour dough. Microorganisms indigenous to flour and air-borne microorganisms which adventitiously infect the flour proliferate in the flour and water mixture. Among these microorganisms have been identified certain yeasts and lactic acid bacteria which reportedly are responsible for the above noted effects. The indigenous yeasts which provide the leavening action are more resistant to high acidity levels than is conventional baker's yeast. While sour dough bread may be prepared without the addition of baker's yeast, such is sometimes added to the dough shortly before baking to provide additional leavening action. In recent years, bacterial cultures have become available which may be used in the sour dough method in place of a naturally developed starter.

In modern bakery practice, the sponge and dough method is commonly used to prepare bread dough. In this method a portion of the flour, usually somewhat more than half of the total flour required for the amount of bread desired, is combined with water and baker's yeast and set aside for a number of hours until the dough is well leavened. This preparation or sponge is then combined with the remainder of the flour and other ingredients of the dough. In preparing sour bread dough by traditional methods, the sponge is set aside for a number of hours to allow microorganisms hopefully in the flour and in the environment to proliferate in the sponge in order that the products of their metabolism may affect leavening and acidification of the dough. To achieve sufficient leavening and acidification may require as long as 24 to 48 hours. The sponge is then combined with the remainder of the dough ingredients and the complete dough is allowed to ferment over a period of at least several hours before being shaped into loaves.

In a more modern process for preparing sour dough, a small quantity of well aged dough from a previous batch of sour dough is combined with flour, water and other dough ingredients. This mixture is then set aside for about 15 hours to allow fermentation to occur.

There are a number of processes described in the art relating to the preparation of sour dough and products prepared therefrom. U.S. Pat. No. 3,734,743 to Kline et al. discloses a process for preparing sour dough French bread wherein a prepared culture of viable cells of sour dough yeast and lactic acid bacteria is inoculated into a mixture of dough ingredients. This process requires a sponge development time of 7 to 8 hours. U.S. Pat. No. 2,875,280 to Williams et al. relates to a process for making sour dough pancake batter wherein a mixture of pancake batter ingredients is inoculated with bacteria and yeast cells. Canadian Pat. No. 868,302 relates to a process for producing yeast leavened baked goods by the sour dough method. According to this process, the addition of cysteine-N-carbamide as an activator substantially reduced blending time for obtaining a consistent dough. Canadian Pat. No. 528,622 discloses a leavening agent for raising and souring dough comprising yeast and acid forming bacteria. In an article in *Baker's Digest*, Vol. 40, pp. 77–80 (1966) a process is described for preparing rye bread by a so-called short sour dough method. In this method, a starter is added to a portion of the dough ingredients and the mixture is held at 95°F for 3 hours to ripen the same before it is combined with the remainder of the dough ingredients.

There are a number of disadvantages associated with traditional methods for preparing sour dough. These methods are largely empirical and, as a result, adequate control of leavening activity and degree of acidification of the dough are difficult to control. These parameters are thus subject to considerable variability not only between batches of sour dough but also between sour doughs prepared by traditional methods in different geographical areas. For example, it apparently has not been possible to duplicate the highly esteemed San Francisco sour dough bread in all areas of the United States due, possibly, to differences in indigenous microbial populations.

In most prior art processes for preparing acidified dough, the acidity required to impart a distinctive acid taste to sour dough bread has largely precluded the use of baker's yeast since such acidity is detrimental to the yeast. As noted above, baker's yeast is sometimes incorporated into sour dough prepared by conventional methods shortly before the dough is baked, thus shortening the time during which the acid provided by the starter is in contact with the yeast. High acidity levels in the dough during proofing thereof may also adversely affect the gluten of the dough and result in unsatisfactory bread volume and texture.

Accordingly, it is a principal object of the present invention to provide a process for preparing acidified bread dough containing baker's yeast.

It is another object of the present invention to provide a process for preparing acidified bread dough which may be baked to provide sour dough bread.

It is also an object of the present invention to provide a process for preparing acidified bread dough suitable for preparing sour dough bread which does not require lengthy fermentation or proofing time.

It is still another object of the present invention to provide a process for preparing acidified bread dough without the use of a starter or a starter culture.

It is a further object of the present invention to provide a product suitable for preparing acidifed bread dough wherein acidification is provided by an effective amount of fumaric acid coated with an edible material.

These objects, and other objects which will be apparent from the following, are achieved in accordance with the present invention by providing in a dough suitable for producing yeast leavened sour dough bread an effective amount of fumaric acid coated with an edible material to acidify the dough without substantially adversely effecting the leavening activity of the yeast, said coating having a melting point temperature higher than normal proofing temperatures but within the range of normal baking temperatures.

In the present process, the prepared dough is shaped into loaves and set aside to proof for about 1 hour. During this period the bulk of the yeast leavening activity and increase in dough volume are effectuated. Such relatively short proofing time demonstrates a major advantage of the present process for producing sour dough bread over other processes wherein lenghty proofing times are required. Generally, in commercial bakeries, proofing is carried out at a temperature in the range of from about 110° to 120°F while in home baking procedures, bread dough is generally proofed at a temperature in the range of from about 80° to 85°F. At home, bread is baked at an oven temperature of about 400°F while in commercial bakeries, the oven temperature may be as high as 500°F.

The coating is substantially unaffected at normal proofing temperatures so that the fumaric acid does not contact the yeast until the dough is baked. In the preparation of bread dough, the ingredients undergo a considerable amount of mixing. Kneading of dough is, of course, a particularly effective way of effecting such mixing. In the present process, the coated particles of fumaric acid are substantially evenly distributed throughout the dough as a result of such mixing or kneading. Thus, when the fumaric acid is freed of its coating during baking of the dough, acidic or sour flavor is essentially evenly distributed throughout the dough and the bread prepared therefrom. The acidic flavor and aroma of sour dough bread may be augmented and a characteristic vinegar-like flavor imparted thereto by providing in the dough a source of acetic acid such as sodium diacetate. The amount of acetic acid provided should not, of course, be such as to detrimentally affect the yeast.

The edible material with which the fumaric acid is coated should be such that the coating remains substantially intact during proofing of the dough but melts within the range of normal baking temperatures. Such material must, of course, be compatible with the other dough ingredients and melt at a temperature higher than normal proofing temperatures, preferably at a melting point temperature of above about 125°F. Exemplary of such materials are vegetable fat, gelatin and vegetable gums.

The amount of fumaric acid incorporated into the dough will, in general, depend upon the degree of acidity desired in the finished bread. In general, breads having the characteristic flavor and aroma of sour dough bread will have a titratable acidity in the range of from about 4 to about 5. Titratable acidity is defined as a measure of the free acid in the bread and is expressed as the number of milliliter of 0.15N NaOH required to increase the pH of a 10 percent aqueous suspension of the bread to 6.6. The pH of a 10 percent aqueous suspension of sour dough bread should preferably be in the range of from about 3.5 to 4.5.

A number of coated acids were investigated for use as acidulents in the present process. When coated fumaric, adipic or citric acid were incorporated into suitable doughs, the dough containing coated fumaric acid produced bread most characteristic of sour dough bread. Breads produced from dough containing coated adipic or citric acids were less satisfactory, particularly in terms of their appearance and texture.

In order to more clearly describe the nature of the present invention, specific examples will hereafter be described. It should be understood, however, that this is done solely by way of example and is intended neither to delineate the scope of the invention nor limit the ambit of the appended claims.

EXAMPLE I

This Example illustrates the use of coated fumaric acid to acidify dough suitable for producing sour dough bread.

A series of doughs suitable for preparing French bread each comprising about 200 grams of flour and 11.6 grams of active dry yeast were acidified with two different levels of fumaric acid coated with vegetable fat having a melting point of 125° F and two different levels of sodium diacetate. The doughs were shaped into loaves which were proofed at 86° F and then baked in an oven at 400°F. Included for comparison purposes in the data shown in Table I, below, are values determined for a commercial sour French bread.

TABLE I

| Dough Sample | Coated Fumaric Acid* % on Flour | Sodium Diacetate % on Flour | Dough Proof Time at 86°F minutes | SOUR FRENCH BREAD | | |
|---|---|---|---|---|---|---|
| | | | | Specific Volume ml./gram | pH of 10% Suspension | Titratable Acidity 10% Suspension ml. of 0.15N NaOH to pH 6.6 |
| 1 | 0.413 | 0.0424 | 50.0 | 4.15 | 4.05 | 3.60 |
| 2 | 0.413 | 0.0424 | 65.0 | 4.18 | 3.90 | 4.78 |
| 3 | 0.621 | 0.0424 | 65.2 | 4.21 | 3.80 | 4.74 |
| 4 | 0.621 | 0.0828 | 75.0 | 4.00 | 3.90 | 4.81 |
| Commercial Sour French Bread | — | — | — | 4.70 | 4.25 | 4.31 |

*Cap-Shure Fumaric 125, Balchem Corp., Slate Hill, New York (contains about 87% fumaric acid)

From the above data, it is apparent that sour French bread prepared from dough containing fat coated fumaric acid was comparable in specific volume and acidity to commercial sour French bread. The experimental breads were considered to have the characteristic flavor and aroma of sour French bread.

EXAMPLE II

This example illustrates the effect of various coated acids on bread dough and on bread produced therefrom.

A series of doughs was prepared as shown in Example I. To individual doughs was added 0.621 percent (based on flour) of fumaric acid coated with fats having melting points of 125° and 165°F., respectively. To other doughs in the series were added equivalent amounts of adipic and citric acids, each coated with fat having a melting point of 125°F. A dough containing 0.621 percent of uncoated fumaric acid served as control. All doughs contained 0.0424 percent sodium diacetate based on flour. The acidified doughs were shaped, proofed and baked as described in Example I. The results are shown in Table II and Table III below.

Table II shows that doughs containing coated fumaric and adipic acids proofed satisfactorily while doughs containing uncoated fumaric acid and coated citric acid failed to proof satisfactorily.

The data in Table III demonstrate that of the acids tested, coated fumaric acid was most suitable for acidifying sour dough. Bread prepared from dough containing coated adipic acid was unsatisfactory in regard to crust color while bread prepared from dough containing coated citric acid was unsatisfactory in regard to both crust color and grain.

TABLE II

| | | | | SOUR FRENCH BREAD | | | |
|---|---|---|---|---|---|---|---|
| Acidulent | Melting Point of Fat °F | Fat Coated Acidulent % on Flour | Dough Proof Time at 86°F minutes | Weight grams | Volume ml. | pH of 10% Suspension | Titratable Acidity 10% Suspension ml. of 0.15N NaOH to pH 6.6 |
| Fumaric Acid | Not coated | none | *** | 288 | 623 | 4.02 | 4.42 |
| Fumaric Acid | 125 | 0.621 | 61.3 | 290 | 978 | 3.95 | 5.00 |
| Fumaric Acid+ | 165 | 0.621 | 58.9 | 288 | 1,038 | 4.09 | 4.68 |
| Adipic Acid* | 125 | 0.850 | 57.1 | 292 | 880 | 4.50 | 4.94 |
| Citric Acid** | 125 | 0.700 | 78.6 | 291 | 625 | 4.20 | 4.24 |

+Cap-Shure Fumaric 165, Balchem Corp., Slate Hill, New York (containss about 87% fumaric acid)
*Cap-Shure Adipic 125, Balchem Corp. (contains about 80% active adipic acid)
**Cap-Shure Citric 125, Balchem Corp. (contains about 85% active citric acid)
***Did not fully proof; gluten was runny

TABLE III

Evaluation of Breads Prepared from Doughs Containing Uncoated Fumaric Acid and Coated Fumaric, Adipic and Citric Acid

| Acidulent | Melting Point of Fat °F | Crust Color | Grain | Taste |
|---|---|---|---|---|
| Fumaric Acid | not coated | Yellowish-white, very mottled. | Very tight and gummy | Good acid bite |
| Fumaric Acid | 125 | Golden brown | Slightly tight, slightly gummy | Good acid bite |
| Fumaric Acid | 165 | Golden brown | Slightly tight, slightly gummy | Good acid bite |
| Adipic Acid | 125 | Brown, speckled with dark brown spots | Slightly tight, slightly gummy | Moderate acid bite |
| Citric Acid | 125 | Yellowish-white, mottled | Very tight and grainy | Strong acid taste |

The terms and expressions which have been employed are used as terms of description and not of limitation and it is not intended by their use to exclude any equivalents of the features shown and described or portions thereof, since it is recognized that various modifications are possible within the scope of the invention claimed.

What is claimed is:

1. A process for preparing acidified bread dough comprising incorporating into a dough suitable for producing yeast leavened sour dough bread an effective amount of fumaric acid coated with an edible material to acidify the dough without substantially adversely affecting the leavening activity of the yeast, said coating having a melting point temperature higher than normal proofing temperatures but within the range of normal baking temperatures, the amount of coated fumaric acid being sufficient to provide a titratable acidity of from about 4 to about 5 in the bread when the dough is baked.

2. A process for preparing acidified bread dough as defined in claim 1, wherein fumaric acid is coated with an edible material having a melting point temperature of above about 125°F.

3. A process for preparing acidified bread dough as defined in claim 2, wherein the fumaric acid is coated with an edible material selected from the group consisting of vegetable fat, gelatin and vegetable gums.

4. A process for preparing acidified bread dough as defined in claim 3, wherein the fumaric acid is coated with vegetable fat.

5. A process for preparing acidified bread dough as defined in claim 2, wherein the yeast used to leaven the dough is active dry yeast.

6. A process for preparing acidified bread dough as defined in claim 5, wherein the amount of fumaric acid incorporated into the dough is sufficient to provide a pH of from about 3.5 to about 4.5 in bread produced from the acidified dough.

7. A process for preparing acidified bread dough as defined in claim 2, wherein the acidified dough contains a source of acetic acid.

8. Acidified bread dough suitable for producing sour dough bread comprising flour, baker's yeast and an effective amount of fumaric acid coated with an edible material to acidify the dough without substantially adversely affecting the leavening activity of the yeast, said coating having a melting point temperature higher than normal proofing temperatures but within the range of normal baking temperatures, the amount of coated fumaric acid being sufficient to provide a titratable acidity of from about 4 to about 5 in the bread when the dough is baked.

9. Acidified bread dough suitable for producing sour dough bread as defined in claim 8, wherein the fumaric acid is coated with an edible material having a melting point temperature of above about 125°F.

* * * * *

UNITED STATES PATENT OFFICE
CERTIFICATE OF CORRECTION

PATENT NO. : 3,922,350
DATED : November 25, 1975
INVENTOR(S) : William G. Dockendorf and Harold Gross It is certified that error appears in the above-identified patent and that said Letters Patent are hereby corrected as shown below:

Title page, under References Cited; "Veno et al." should read --Ueno et al.--.

Column 3, line 14; "lenghty" should read --lengthy--.

Column 4, line 31; "200" should read --622--.

Signed and Sealed this twentieth Day of April 1976

[SEAL]

Attest:

RUTH C. MASON
Attesting Officer

C. MARSHALL DANN
Commissioner of Patents and Trademarks